(12) United States Patent
Bellezza (10) Patent No.: US 9,533,725 B2
(45) Date of Patent: Jan. 3, 2017

(54) PLANT FOR ASSEMBLING MECHANICAL PARTS ON VEHICLE BODIES

(71) Applicant: CPM S.p.A., Turin (IT)

(72) Inventor: Massimo Bellezza, Turin (IT)

(73) Assignee: CPM S.p.A., Turin (IT)

( * ) Notice: Subject to any disclaimer, the term of this patent is extended or adjusted under 35 U.S.C. 154(b) by 154 days.

(21) Appl. No.: 14/386,289

(22) PCT Filed: Mar. 19, 2013

(86) PCT No.: PCT/IB2013/052180
§ 371 (c)(1),
(2) Date: Sep. 18, 2014

(87) PCT Pub. No.: WO2013/140340
PCT Pub. Date: Sep. 26, 2013

(65) Prior Publication Data
US 2015/0047184 A1   Feb. 19, 2015

(30) Foreign Application Priority Data

Mar. 19, 2012   (IT) .............................. TO2012A0241

(51) Int. Cl.
*B23P 19/00*   (2006.01)
*B62D 65/18*   (2006.01)
(Continued)

(52) U.S. Cl.
CPC .............. *B62D 65/18* (2013.01); *B23P 19/04* (2013.01); *B23P 21/004* (2013.01); *B62D 65/022* (2013.01);
(Continued)

(58) Field of Classification Search
CPC ...... B61B 10/02; B61B 10/022; B61B 10/025; B61B 10/027; B61B 3/00; B61B 3/02;B65G 35/08; B65G 2201/0294; B62D 65/02; B62D 65/022; B62D 65/024; B62D 65/10; B62D 65/12; B62D 65/18; Y10T 29/534; Y10T 29/53417; Y10T 29/53539; Y10T 29/53543; Y10T 29/53548; Y10T 29/49828; Y10T 29/49829; Y10T 29/49831
See application file for complete search history.

(56) References Cited

U.S. PATENT DOCUMENTS 3,968,599 A * 7/1976 Gill ..................... B24B 13/005
451/390
4,924,996 A * 5/1990 Svensson ............. B05B 15/061
134/123
(Continued)

FOREIGN PATENT DOCUMENTS

EP   0 751 061 A1   1/1997
EP   2 340 982 A1   7/2011

*Primary Examiner* — Essama Omgba
(74) *Attorney, Agent, or Firm* — Blank Rome LLP (57) ABSTRACT

A plant including: an assembly line along which a plurality of pallets are circulated in a closed loop, divided into a first section, where the pallets are loaded in a plurality of first stations with mechanical parts to be assembled, and into a second section, where the pallets advance along a plurality of second stations; a conveyor arranged at least partially parallel to and above the second section, along which a plurality of balance supports provided with bodies run; a coupling station, arranged immediately upstream of the second section, where the pallets are integrally coupled to the balance supports; and a decoupling station, where the pallets are separated from the balance supports; each pallet having selectively engageable and releasable fastening means for a balance support and elastic means able to receive the balance support resting thereon.

8 Claims, 6 Drawing Sheets

(51) Int. Cl.
*B23P 19/04* (2006.01)
*B23P 21/00* (2006.01)
*B62D 65/02* (2006.01)

(52) U.S. Cl.
CPC ......... *Y10T 29/49829* (2015.01); *Y10T 29/534* (2015.01); *Y10T 29/53417* (2015.01); *Y10T 29/53539* (2015.01); *Y10T 29/53548* (2015.01)

(56) References Cited

U.S. PATENT DOCUMENTS

| | | | | |
|---|---|---|---|---|
| 4,928,386 A * | 5/1990 | Schupp | ................... | B62D 65/02 108/138 |
| 5,513,428 A * | 5/1996 | Shiramizu | ............ | B23P 21/004 29/712 |
| 5,644,991 A * | 7/1997 | Prevot | ................... | B65D 19/40 108/54.1 |
| 6,109,424 A * | 8/2000 | Doan | ..................... | B62D 65/02 198/468.8 |
| 6,196,372 B1 * | 3/2001 | Rossi | .................... | B62D 65/00 198/345.1 |
| 6,427,321 B2 * | 8/2002 | Fedato | ................... | B62D 65/18 29/281.5 |
| 6,554,119 B2 * | 4/2003 | Oldford | ................. | B62D 65/18 198/345.3 |
| 6,557,690 B2 * | 5/2003 | Oldford | ................. | B62D 65/18 198/346.3 |
| 6,564,440 B2 * | 5/2003 | Oldford | ............... | B23P 21/004 29/407.01 |
| 6,695,126 B2 * | 2/2004 | Minamikawa | ......... | B62D 65/18 104/172.4 |
| 6,766,894 B2 * | 7/2004 | Arai | ...................... | B62D 65/18 198/465.4 |
| 6,814,219 B2 * | 11/2004 | Shimizu | ................. | B62D 65/18 104/172.4 |
| 6,827,197 B2 * | 12/2004 | Oldford | ................. | B62D 65/18 198/345.2 |
| 6,959,801 B2 * | 11/2005 | Shibata | .................. | B62D 65/18 198/345.2 |
| 7,128,196 B2 * | 10/2006 | Oldford | ................. | B62D 65/18 198/345.3 |
| 7,225,914 B2 * | 6/2007 | Nakamura | ............. | B62D 65/18 198/465.4 |
| 7,461,733 B2 * | 12/2008 | Dohi | ...................... | B62D 65/18 198/345.1 |
| 7,461,735 B2 * | 12/2008 | Nakamura | ........... | B65G 19/025 198/465.4 |
| 7,484,616 B2 * | 2/2009 | Nakamura | ............. | B61B 10/02 104/172.2 |
| 7,789,021 B2 * | 9/2010 | Nishihara | ............. | B61B 13/127 104/172.4 |
| 7,798,068 B2 * | 9/2010 | Nishihara | ................ | B61B 3/02 104/172.4 |
| 8,424,206 B2 * | 4/2013 | Tanahashi | ............ | B62D 31/003 29/429 |
| 9,045,182 B2 * | 6/2015 | Cardani | ................. | B23P 19/06 |
| 2003/0000413 A1 * | 1/2003 | Arai | ...................... | B62D 65/18 104/89 |
| 2004/0206605 A1 * | 10/2004 | Shibata | .................. | B62D 65/18 198/465.4 |
| 2006/0032728 A1 * | 2/2006 | Smith | ..................... | B62D 65/18 198/468.6 |
| 2007/0289845 A1 * | 12/2007 | Takano | .................. | B61B 13/127 198/465.4 |
| 2008/0135382 A1 | 6/2008 | Nakamura | | |
| 2009/0193998 A1 * | 8/2009 | Nishihara | ................ | B61B 3/02 104/91 |
| 2009/0205532 A1 * | 8/2009 | Nishihara | ............. | B61B 13/127 105/149 |
| 2011/0154654 A1 * | 6/2011 | Cardani | .................. | B23P 19/06 29/795 |
| 2015/0239078 A1 * | 8/2015 | Cardani | .................. | B23P 19/06 29/795 |

* cited by examiner

PLANT FOR ASSEMBLING MECHANICAL PARTS ON VEHICLE BODIES

TECHNICAL FIELD

The present invention relates to a plant intended to carry out the assembly of mechanical parts on vehicle bodies.

Hereinafter, "mechanical parts" means both the engine of the vehicle and/or mechanical parts of the transmission (gearbox, axles, etc.), and any other mechanical part destined to be assembled on a vehicle body/bodywork, such as the front and rear suspension, also including the associated springs and shock absorbers.

BACKGROUND ART

A plant of this type is known from EP2340982, comprising an assembly line divided into two sections, which are mounted one above the other, the first beneath the second. A plurality of pallets, on which the mechanical parts to be assembled on each body are arranged in sequence and according to a pre-established layout, are moved along the first section in a first determined direction. The completed pallets are then moved to the second section by an elevator, and here they are moved in a second direction, opposite to the first, after having had a body coupled to each pallet, the body being brought to the plant by a conveyor that is not part of the plant. Each of the bodies is thus supported by a corresponding pallet, directly on the pallet together with the parts to be assembled. Once assembly of the mechanical parts carried by each pallet on the respective body is completed, the latter and the pallet are separated and the pallet is returned, empty, to the first section by means of a lowerator, for being used again.

The plant described, although satisfactory, has several drawbacks. To start with, it requires a series of operations to separate the bodies from the conveyor and then mount them on it again or on another conveyor, and to mount and dismount the bodies on/from the pallets, operations that can also require the involvement of one or more workers. Furthermore, the body can be subjected to undesired mechanical stress during assembly operations.

DISCLOSURE OF INVENTION

The object of the present invention is therefore to overcome the drawbacks of the prior art and, in particular, to provide an assembly plant relatively simple to realize, of high reliability and where all body handling operations to and from the pallets can be carried out entirely automatically.

According to the invention, a plant for assembling mechanical parts on vehicle bodies is therefore provided.

In particular, the assembly plant of the invention comprises an assembly line along which a plurality of pallets are circulated in a closed loop; the assembly line is divided into a first and a second section comprising a plurality of first and second stations, respectively; the pallets sequentially advance in a first predetermined direction along the first section where they are progressively loaded, in the first stations, with a predetermined group of mechanical parts to be assembled, arranged on each pallet according to a defined layout, after which the pallet sequentially advance along the second section, in a second direction, opposite to the first, where the predetermined group of mechanical parts carried by each pallet is progressively assembled in sequence, in the second stations, on a respective vehicle body.

According to the main characteristic of the invention, however, a conveyor for transporting bodies also forms an integral part of the assembly plant, the conveyor being arranged at least partially parallel to the second section so as to run above the second stations; a plurality of balance supports run along the conveyor, each fixedly provided with a body, and it is these balance supports that, according to the invention, are fixedly coupled to the pallets in the second section of the assembly line, without ever separating the bodies from the balance supports.

To this end, the plant according to the invention also comprises a coupling station, arranged immediately upstream of the second section, with reference to the pallet movement direction along the second section, and provided with means for fixedly coupling each pallet to a balance support so that the latter is supported by the pallet; and a decoupling station, arranged immediately downstream of the second section, with reference to the pallet movement direction along the second section, and provided with means for decoupling the pallets from the balance supports.

In greater detail, each pallet is equipped with its own fastening means, which can be selectively engaged and released in order to fixedly secure a balance support to it; and with elastic means able to receive the balance support resting on them in order to remain compressed between the latter and the pallet when the fastening means are engaged. In addition, the coupling and decoupling stations comprise means for selectively controlling the engagement or release of the fastening means of each pallet; means for carrying out a relative vertical movement between a pallet and a respective balance support that are positioned on said stations; and selectively engageable, vertical positioning means for the balance supports, able to block any upward vertical movements of the balance support present each time on the station.

In this way, it is never necessary to remove the bodies from the conveyor and then mount them on it again, thereby eliminating these operations, with consequent savings in time and space, as it is not necessary to provide a special station for performing these operations; furthermore, the operation of securing the bodies on the pallets can be carried out entirely automatically in the coupling (or "marriage") and decoupling (or "demarriage") stations. However, above all, the bodies are not directly supported by the pallets, but continue to be supported by the conveyor's balance supports, the weight of which is supported by the springs of the pallets. The balance supports can thus absorb possible stress produced by the assembly operations.

Finally, in the preferred case where the second section is arranged on top of the first section, the second section is implemented as a modular scaffolding framework that provides, for each second station in which assembly operations must be carried out from beneath vehicle's body, a deck suspended above the first section and arranged vertically between the first and the second section, without interfering with the first stations; the deck is equipped with automatic or manual assembly means, for example electric screwdrivers, and can accommodate and support one or more workers.

BRIEF DESCRIPTION OF THE DRAWINGS

Further characteristics and advantages of the present invention will become clear from the description that follows of a non-limitative embodiment thereof, made with reference to the figures in the attached drawings, where.

BEST MODE FOR CARRYING OUT THE INVENTION

Figure 1A:
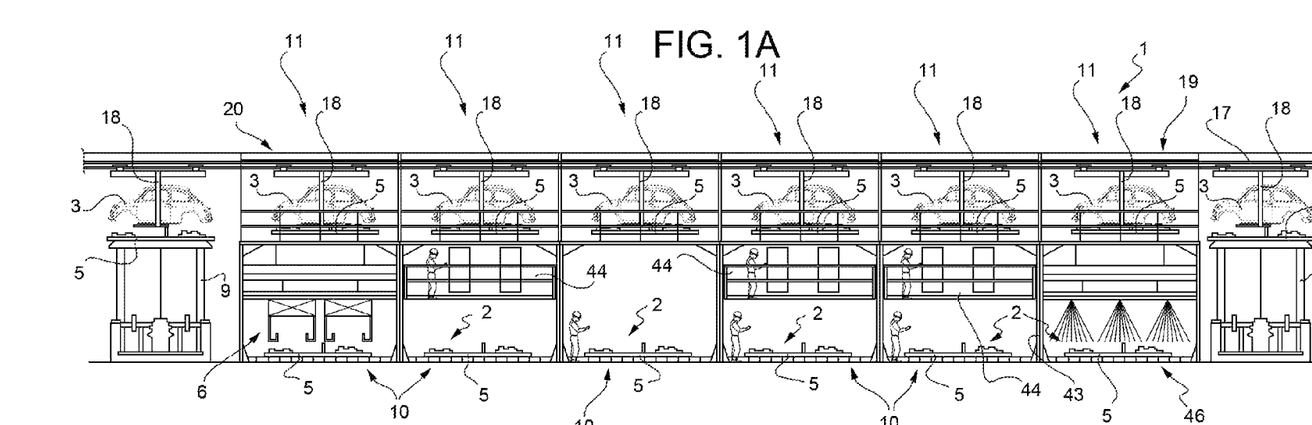
FIG. 1A shows a view in elevation of a plant for assembling mechanical parts on vehicle bodies made according to the invention.

With reference to FIGS. 1 to 7, reference numeral 1 indicate, as a whole, a plant for assembling mechanical parts 2, known and only illustrated schematically for simplicity, on vehicle bodies 3; the plant 1 comprises an assembly line 4 along which a plurality of pallets 5 are circulated in a closed loop; the line 4, on the whole of known type, thus constitutes an endless loop conveyor line for the pallets 5 along the aforementioned closed loop that, in the preferred embodiment, is arranged parallel to a vertical plane defined by the plane of the sheet in FIG. 1A.

The line 4 is divided into a first section 6 and into a second section 7, which is arranged over the first section 6 in the preferred embodiment shown; sections 6 and 7 have the same extension in the direction of movement of the pallets 5, which is straight in the example shown, and a lifting station 8 and a lowering station 9, both of known type, are arranged at the beginning and end of the first section 6 for transferring the pallets 5 to and from the second section 7.

Figure 1B:
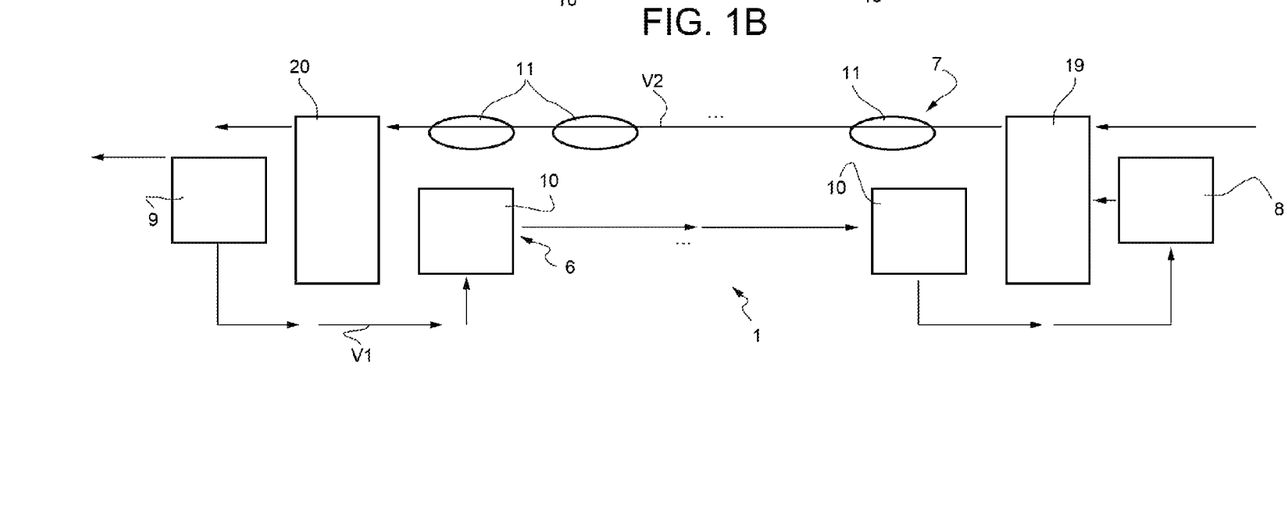
FIG. 1B shows a block diagram of the plant in FIG. 1A, which clarifies the handling dynamics of the bodies and the pallets used in the plant.

Section 6 comprises a plurality of sequentially arranged stations 10 and the pallets 5 advance in sequence, in a line one behind the other, in a first predetermined direction, indicated also in versus by arrow V1 in FIG. 1B, along the entire first section 6; in the various stations 10, the pallets 5 are progressively loaded with a predetermined group of mechanical parts 2 to be assembled, arranged on each pallet 5 according to a defined layout, the pallets 5 subsequently being transferred, one at a time, onto the second section 7, along which they advance in sequence, in a second direction, opposite to the first and indicated also in versus in FIG. 1B by arrow V2.

In turn, section 7 comprises a plurality of stations 11, where the predetermined group of mechanical parts 2 carried by each pallet 5 are progressively assembled in sequence, in stations 11, on a respective vehicle body 3, in an essentially known manner.

Figures 2, 7:
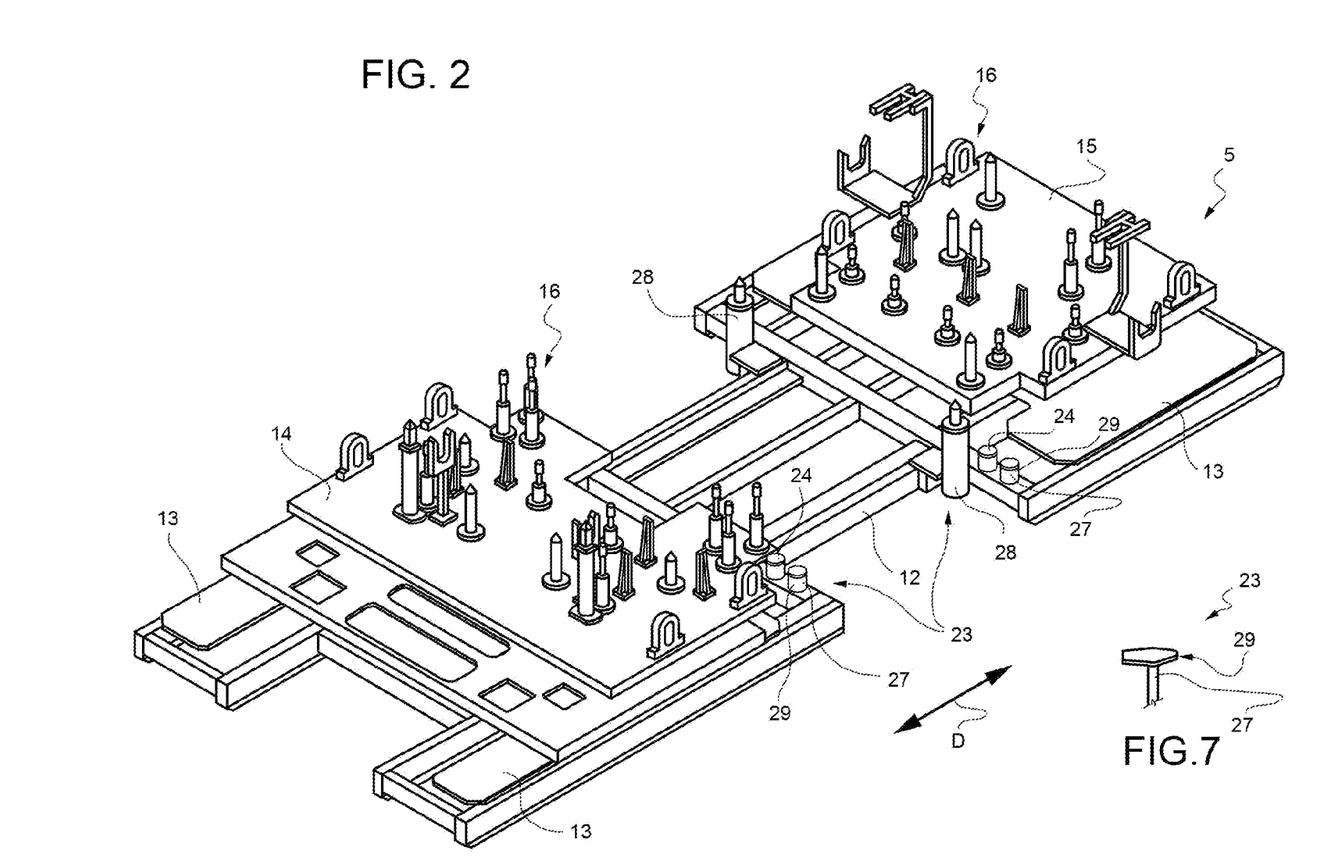
FIG. 2 shows a front three-quarters perspective view, on an enlarged scale, of a pallet forming a first component of the plant in FIG. 1.
FIG. 7 schematically shows, on an enlarged scale, detail of the component in FIG. 2.
Figure 3:
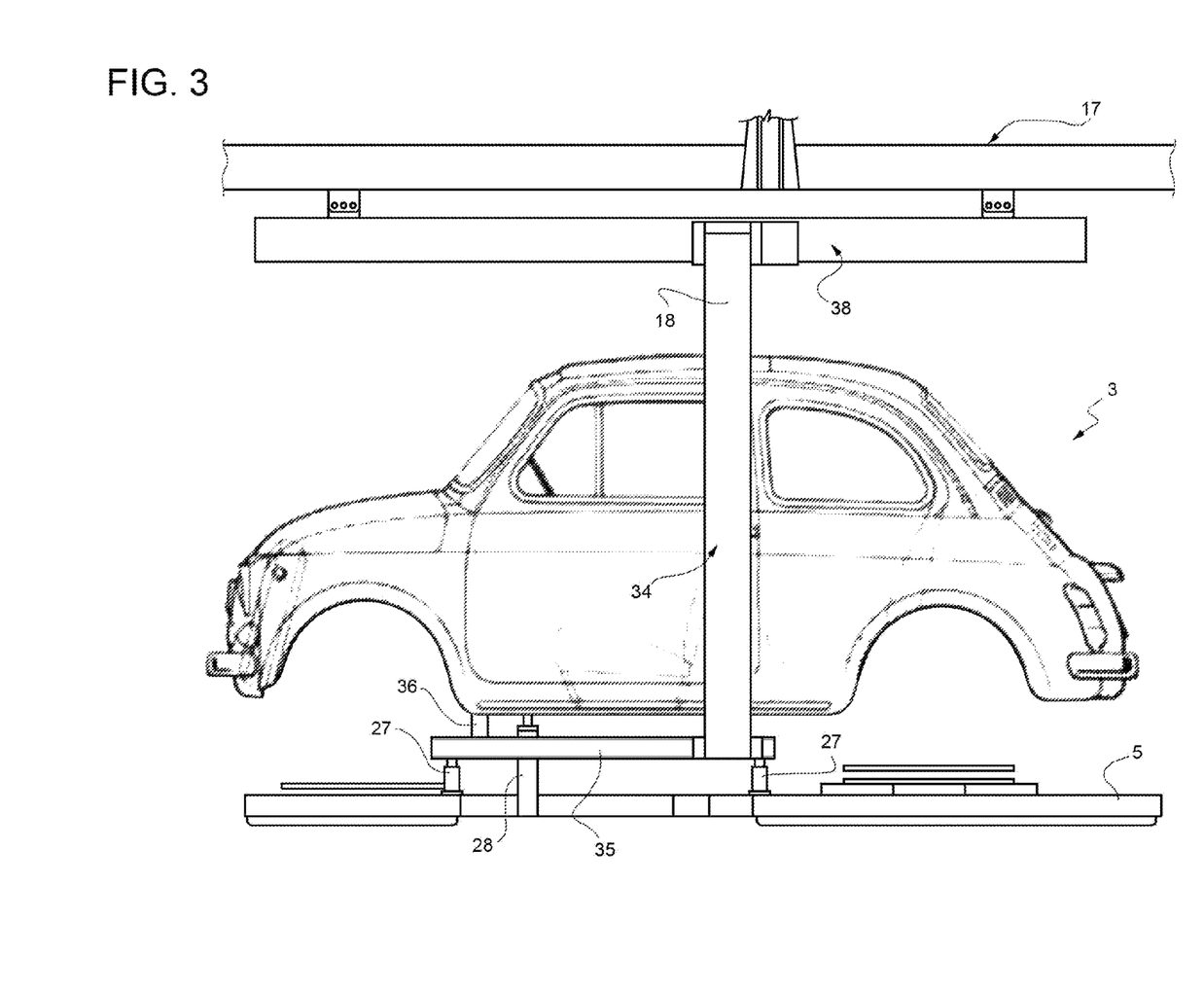
FIG. 3 shows a view in elevation and on an enlarged scale of a body located on a second component of the plant in FIG. 1.
Figure 4:
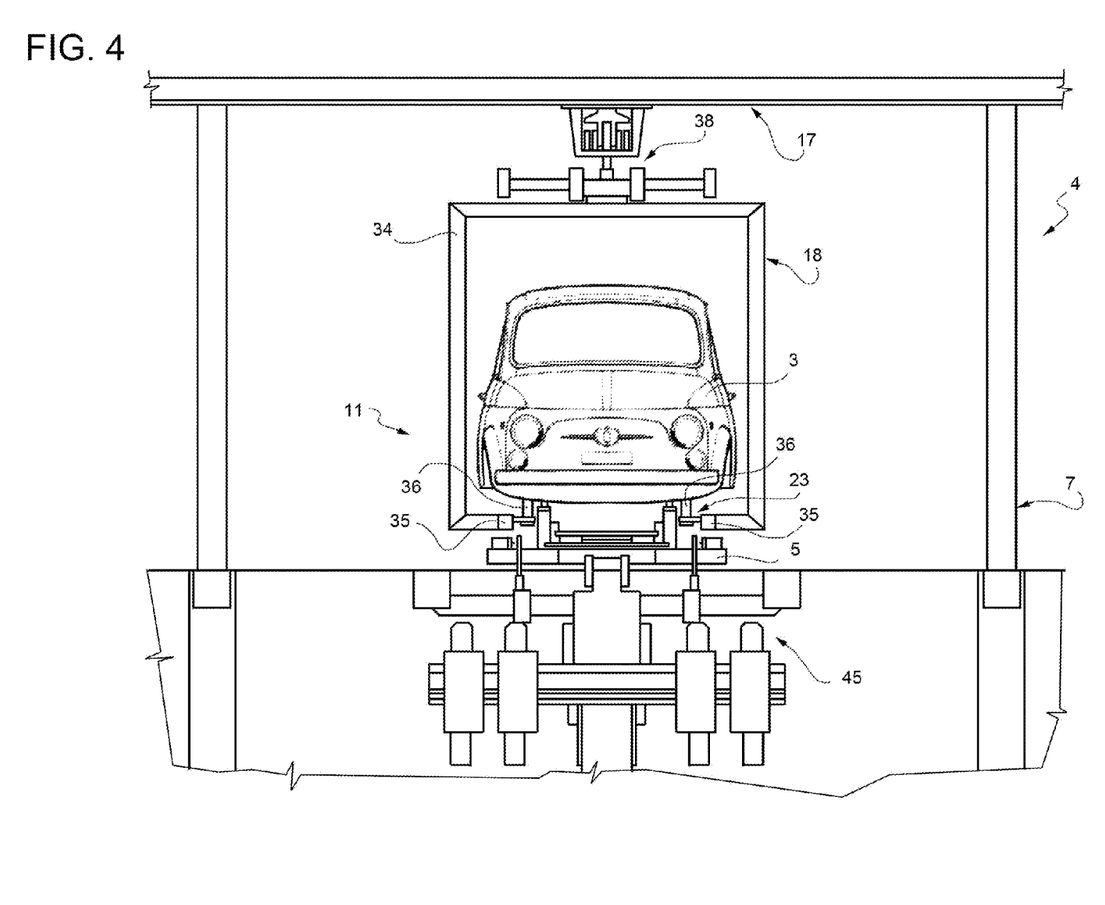
FIG. 4 shows a front elevation view, schematized for simplicity, of an assembly station of the plant in FIG. 1.
Figure 5:
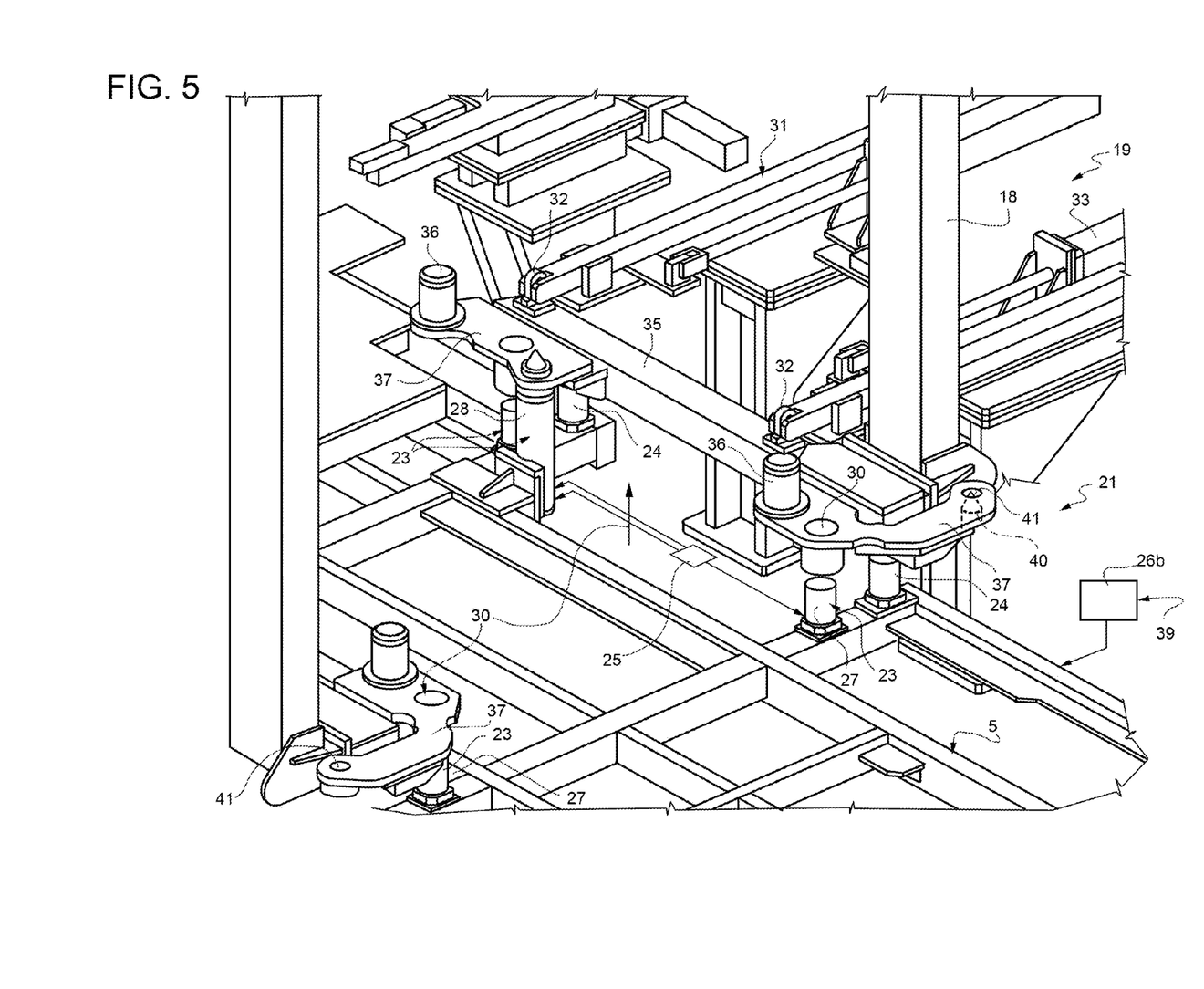
FIG. 5 shows a rear three-quarters perspective view, on an enlarged scale and partially schematic for simplicity, of a coupling station for coupling the first component to the second, made according to the invention.
Figure 6:
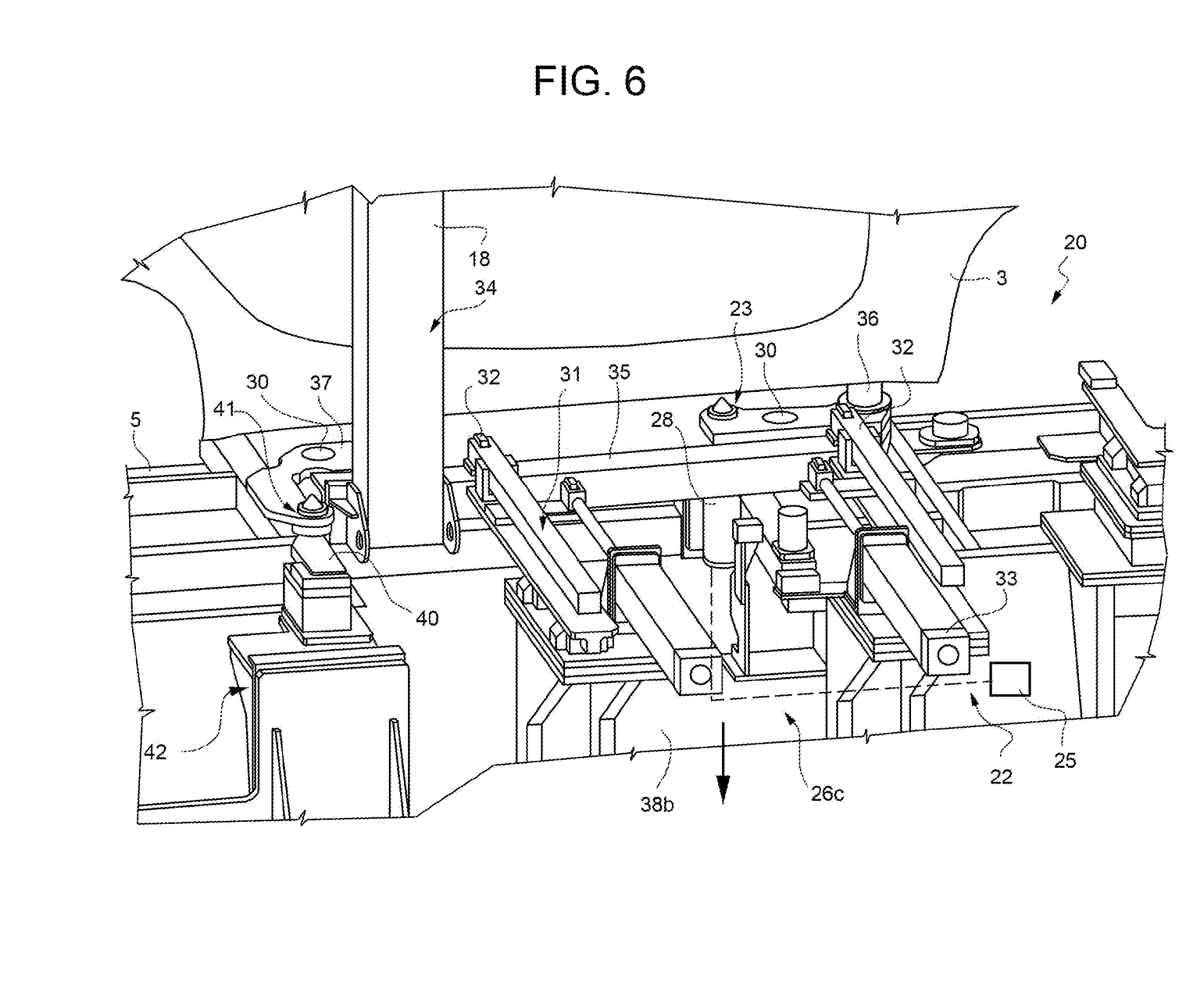
FIG. 6 shows a side perspective view, on an enlarged scale and partially schematic for simplicity, of a decoupling station for decoupling the first component from the second, made according to the invention.

With reference to FIG. 2, each pallet 5 comprises a framework 12 provided with floating plates 13 (for example, on spheres, not shown for simplicity) at opposite ends that, in turn, carry a front sub-pallet or platform 15 and a rear sub-pallet or platform 14, axially slidable in direction D, these being provided, as can the central portion of the framework 12 if necessary, with known equipment 16 for supporting the parts 2 to be assembled.

According to one aspect of the invention, a conveyor 17, of the aerial type, also forms an integral part of the plant 1, this being arranged at least partially parallel to the second section 7 and running above the stations 11; a plurality of balance supports 18, on the whole of known type and each provided with a body 3 run along the conveyor 7.

In addition, according to the invention, the plant 1 also comprises a coupling station 19, arranged immediately upstream of section 7 with reference to direction V2 of movement of the pallets 5 along the second section 7, this station 19 being provided with means 21 (FIG. 5) for fixedly coupling each pallet 5 to a balance support 18 such that the balance support is supported by the pallet 5, so that the weight of the balance support 5 no longer rests on the conveyor 17.

Furthermore, the plant 1 comprises a decoupling station 20, arranged immediately downstream of the second section 7 with reference to direction V2 of movement of the pallets 5 along section 7 and provided with means 22 for separating the pallets 5 from the balance supports 18.

In particular, each pallet 5 (FIG. 2) is fitted with its own fastening means 23, which can be selectively engaged and released to fixedly secure a balance support 18 to it; and with elastic means 24 able to receive the balance support 18 resting upon them, in use, such that they remain compressed between, the balance support and the pallet 5 when the fastening means 23 are engaged.

In addition, stations 19 and 20 comprise means 25, of known type and therefore only indicated schematically with a block, for selectively controlling the engagement or release of the fastening means 23 of each pallet 5 when the latter is arranged on the individual station 19 or 20; and means 26 for carrying out, as it will be seen, a relative vertical movement between a pallet 5 and a respective balance support 18 that are positioned on said stations 19 and 20.

Stations 8 and 9 are positioned immediately upstream and downstream of the coupling 19 and decoupling 20 stations, with reference to direction V2 of movement of the pallets along the second section 7, so as to release and, respectively, take control of the pallet 5 in the position immediately next to the stations 19 and 20.

The selectively engageable and releasable fastening means 23 of each pallet 5 comprise respective rotating fastening pins 27, fitted with hammer heads 29 (FIG. 7), and respective transport pins 28; pins 27 are suitable for coupling by entering respective bottom seats 30 of the balance supports 18; the means 25 of selectively engaging and releasing the fastening means 23 of stations 19 and 20 therefore simply comprise means for rotating pins 27, which, for example, could be known hydraulic or pneumatic pushers, not shown for simplicity, placed in opportune positions and acting on, for example, tangential positioning elements, not shown for simplicity, of pins 27. Alternatively, the rotation of pins 27 could be pneumatically, hydraulically, or electrically controlled by actuators carried on board the pallets 5 and that are controlled by control means 25 in any manner known to persons skilled in the field.

Preferably, at least one pair of pins 28 are axially moveable in a telescopic manner and this movement can also be controlled by the control means 25 in a manner obvious for persons skilled in the field.

In order to easily perform the manoeuvring of the pins 27, 28, stations 19 and 20 are provided with selectively engageable, vertical positioning means 32 for the balance supports 18, able to block upward vertical movements of the balance support 18 present each time on the station 19 or 20. In the example shown, these vertical positioning means 32 are constituted by slipper arms 31 equipped with a pneumatic or hydraulic feed drive 33, which slide perpendicularly to the feed direction of the pallets 5 along section 7.

In particular, each balance support 18 comprises a C-shaped portal element 34, within which a respective body 3 is supported in a known manner, and a pair of side-members or longerons 35 fixed to respective opposite ends of the portal element 34 and projecting from it in a direction of extension of the conveyor 17, in the illustrated case in point, in the feed direction V2 of the pallets 5 in section 7, so that the balance support 18 has the overall aspect of a loading fork; the side-members 35 are provided with known releasable securing means 36 for securing the body 3; according to the invention, each of them is also provided with a flange 37 (FIGS. 5 and 6) that supports the seats 30.

Lastly, each balance support 18 comprises universal mounting means 38 for mounting on the conveyor 17, able to allow limited vertical movements of the balance support 18 with respect to the conveyor 17; the latter can be any known type of aerial conveyor.

The positioning means 32 with the associated drive 33 of at least the decoupling station 20 are mounted on a vertically moveable slide 38b and, together with the latter, constitute the means 26c of relative vertical movement, as will be seen, between a balance support 18 and its associated pallet 5; whereas, at least coupling station 19 is provided with means for raising a pallet 5 positioned on station 19 to the balance support 18; these means 39, schematically indicated with a block, constitute the means 26b of relative vertical movement, as will be seen, between a balance support 18 and its associated pallet 5.

Finally, according to an aspect of the invention, the coupling 19 and decoupling 20 stations comprise first centring means 40, constituted by conical pins in the case in point, mating with second centring means 41 carried by each balance support 18, constituted in the case in point by through holes or seats 41 made through the flange 37 of each side-member 35. Pins 40 are preferably mounted on vertically movable slides 42, like that shown in FIG. 6.

In the preferred embodiment where the second section 7 is arranged on top of the first section 6, the second section 7 is implemented as a modular scaffolding framework 43 that provides, for each station 11 in which the assembly operations of the parts 2 must be carried out from beneath body 3 of the vehicle, a deck 44 (FIG. 1A), which is suspended above section 6, arranged vertically between the first section 6 and the second section 7 and at a height that does not interfere with stations 10; the deck 44 is equipped with automatic or manual assembly means 45 (FIG. 4), for example electric screwdrivers, and can accommodate and support one or more workers (FIG. 1A).

According to the invention, the bodies 3 are conveyed to the line 4 of circular conveyance of the pallets 5 and assembly of the parts 2, by conveyor 17 and, without being removed from the balance supports 18, arrive at station 19, one at a time, together with a pallet 5 "complete" with the parts 2 to be assembled and which has be controlled in a known manner in an optical control station 46; the pallet 5 is raised to section 7 by the elevator 8.

In station 19 (FIG. 5), the balance support 18 is centred, with respect to the pallet 5 and station 19, by raising pins 40 via the slides 42, so that they fit into the seats or holes 41. Then the arms 31 are extended perpendicularly to the side-members 35, until the positioning means 32 are brought over the side-members 35, vertically blocking them in the upward direction; at this point, the pallet 5 is raised upwards by means 39, so as to push it against the balance support 18, which is held stationary; the springs 24 are compressed and take the weight of the balance support 18; in addition, pins are engaged and inserted into the seats 30 and, lastly, pins 27 are made to rotate by the control means 25, so as to bring the heads 29 into a bayonet locking position on the flanges 37 of the side-members 35. At this point, the pallet 5, the balance support 18 and the body 3 secured by it form an integral unit, which can be transported along section 7, through all the stations 11.

Upon completion of assembling the parts 2, the pallet 5, now empty but with the body 3 and the balance support 18 still fastened to it (the parts 2 have now all been assembled on the body 3), arrives at station 20. Here, the balance support 18 is first centred, by means of pins 40 and the slides 42, in a similar manner to that described for station 19. Then the arms 31 are extended perpendicularly to the side-members 35, until they block upward movement of the balance support 18 via the positioners 32. Lastly, thanks to the slide 38b, the balance support 18 is pushed downwards by the arms 32 and the underlying pallet 5, compressing the springs 24. This frees the heads 29 that, no longer being subjected to the axial load exerted by the springs 24, are free to rotate. The means 25 of station 20 (not shown, but identical to those of station 19) then rotate around the pins 27, and the springs 24, by means of their elastic release, push the pallet 5 to disengage it from the side-members 35. Once the arms 31 and the positioners are released, by deactivating the slide 38b, and after having retracted them, the completed body 3 is free to be taken away by the conveyor 17 together with its balance support 18. The empty pallet 5 is instead returned to the lower section 6 by the lowerator 9, ready for a new cycle.

The invention claimed is:

1. A plant for assembling mechanical parts on vehicle bodies, of the type comprising an assembly line along which a plurality of pallets are circulated in a closed loop, the assembly line being divided into a first section and a second section comprising a plurality of first stations and of second stations, respectively, the pallets sequentially advancing in a first predetermined direction along the first section where, in the first stations, they are progressively loaded with a predetermined group of mechanical parts to be assembled, arranged on each pallet according to a defined layout, and the pallets then sequentially advancing along the second section, in a second direction, opposite to the first, where, in the second stations, the predetermined group of mechanical parts carried by each pallet is progressively assembled in sequence on a respective vehicle body; the plant further comprising:
  i) a conveyor arranged at least partially parallel to the second section and above the second stations, a plurality of balance supports running along the conveyor, each fixedly provided with one of said bodies;
  ii) a coupling station, arranged immediately upstream of the second section, with reference to a pallet movement direction along the second section, and
  iii) a decoupling station, arranged immediately downstream of the second section, with reference to the pallet movement direction along the second section;
  wherein:
  a) each pallet is provided with its own fastening means, which can be selectively engaged and released in order to fixedly secure a balance support thereto;

b) each pallet is provided with elastic means able to receive a balance support resting thereon in order to remain compressed between the balance support and the pallet so that the balance support is supported by the pallet and the weight of the balance support no longer rests on the conveyor;

c) said coupling station is provided with means for fixedly coupling each pallet to a balance support consisting of first means of the coupling station for carrying out a relative vertical movement between a pallet and a respective balance support that is positioned on said coupling station to compress said elastic means and second means of the coupling station for selectively actuating the engagement of the fastening means of each pallet while the elastic means are compressed;

d) said decoupling station is provided with means for separating the pallets from the balance supports when the fastening means are engaged, consisting of third means of the decoupling station for carrying out a relative vertical movement between a pallet and a respective balance support that is positioned on said decoupling station to further compress said elastic means and fourth means of the decoupling station for selectively actuating the release of the fastening means of each pallet while the elastic means are further compressed.

2. A plant according to claim 1, wherein said selectively engageable and releasable fastening means of each pallet comprise respective rotating pins, provided with hammer heads and able to couple through respective bottom seats of the balance supports, said second and fourth means of said coupling and decoupling station, respectively, comprising means for rotating said pins.

3. A plant according to claim 2, wherein said fastening means of each pallet comprise at least one pair of pins which are axially movable in a telescopic manner.

4. A plant according to claim 1, wherein the coupling and decoupling stations are provided with selectively engageable, vertical positioning means for the balance supports, able to block upward vertical movements of the balance support present each time on the station.

5. A plant according to claim 4, wherein the positioning means of at least the decoupling station are fitted on a vertically movable slide, and in that at least the coupling station is provided with means for raising a pallet placed thereon towards the balance support.

6. A plant according to claim 1, wherein said coupling and decoupling stations comprise first centering means mating with second centering means carried by each said balance support.

7. A plant according to claim 1, wherein the second section of the assembly line is arranged above the first section, which have the same extension in the pallet movement direction; a lifting station and a lowering station for transferring pallets to and from the second section are is arranged at the beginning and at the end of the first section, and immediately upstream and downstream of the coupling and decoupling stations, respectively, with reference to the pallet movement direction along the second section.

8. A plant according to claim 1, wherein each said balance support comprises:

a C-shaped portal element, within which a respective body is supported and suspended, a pair of side-members fixed to respective opposite ends of the portal element and projecting so as to protrude therefrom in a conveyor extension direction, so that the balance support has the overall aspect of a loading fork, said side-members being provided with releasable securing means for securing the body, and an universal mounting device for mounting the balance support to the conveyor, the universal mounting device being able to allow limited vertical movements of the balance support; said conveyor being an aerial conveyor.

* * * * *